March 18, 1958 J. J. S. SMITH 2,827,027
MULTI-CYLINDER TWO-STROKE CYCLE
INTERNAL COMBUSTION ENGINES
Filed June 9, 1955 11 Sheets-Sheet 3

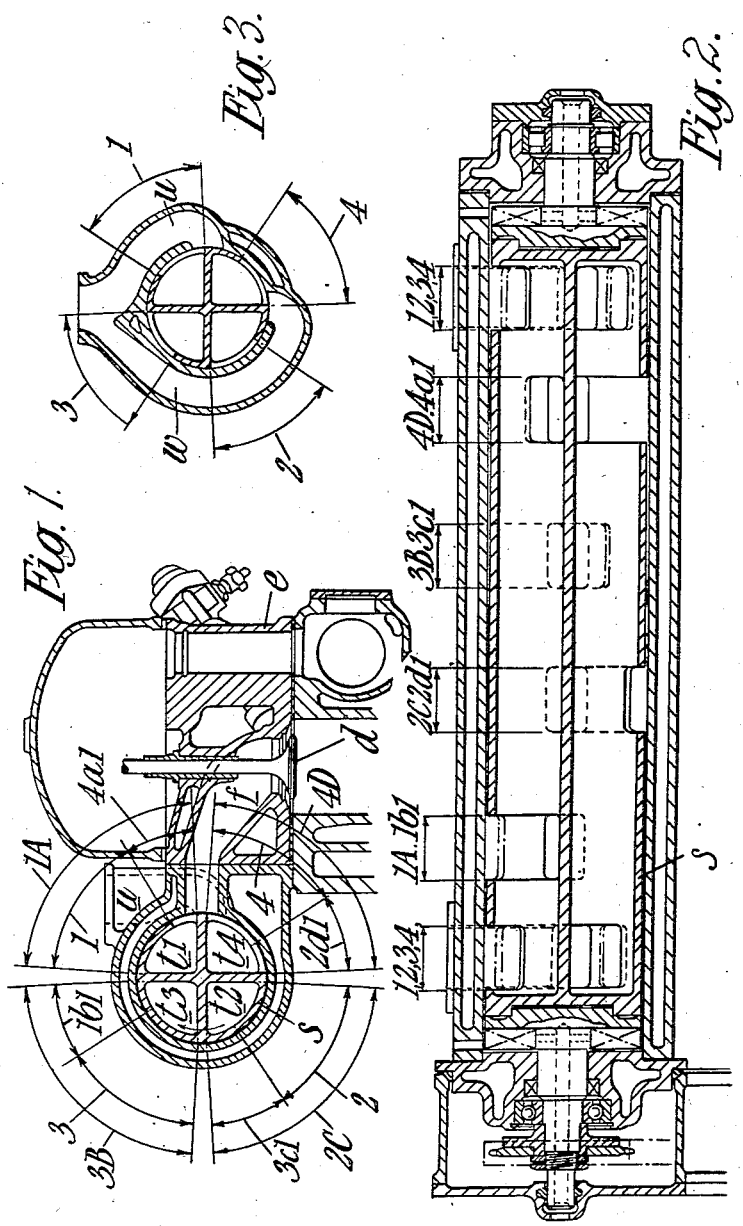

Inventor:
James John Stewart Smith
by Eugene O. Purdy
Attorney

March 18, 1958

J. J. S. SMITH 2,827,027

MULTI-CYLINDER TWO-STROKE CYCLE
INTERNAL COMBUSTION ENGINES

Filed June 9, 1955

Inventor:
James John Stewart Smith
by Eugene D. Purdy
Attorney

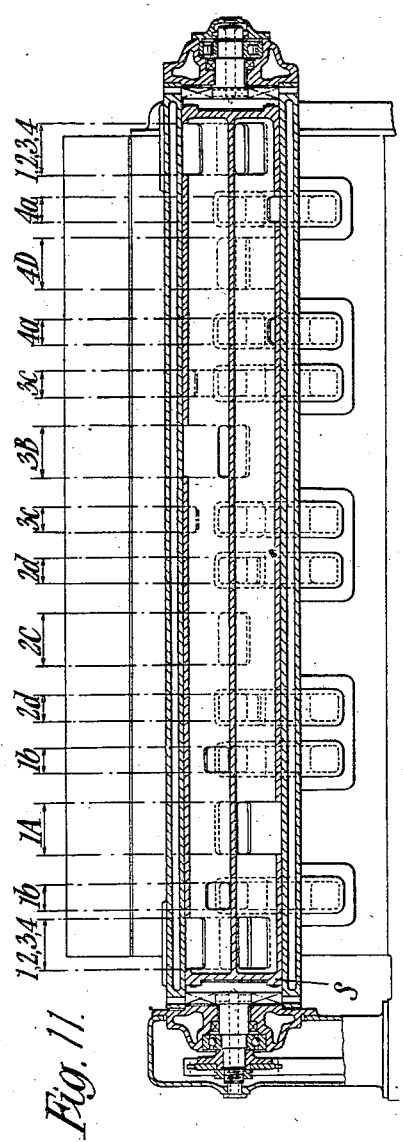

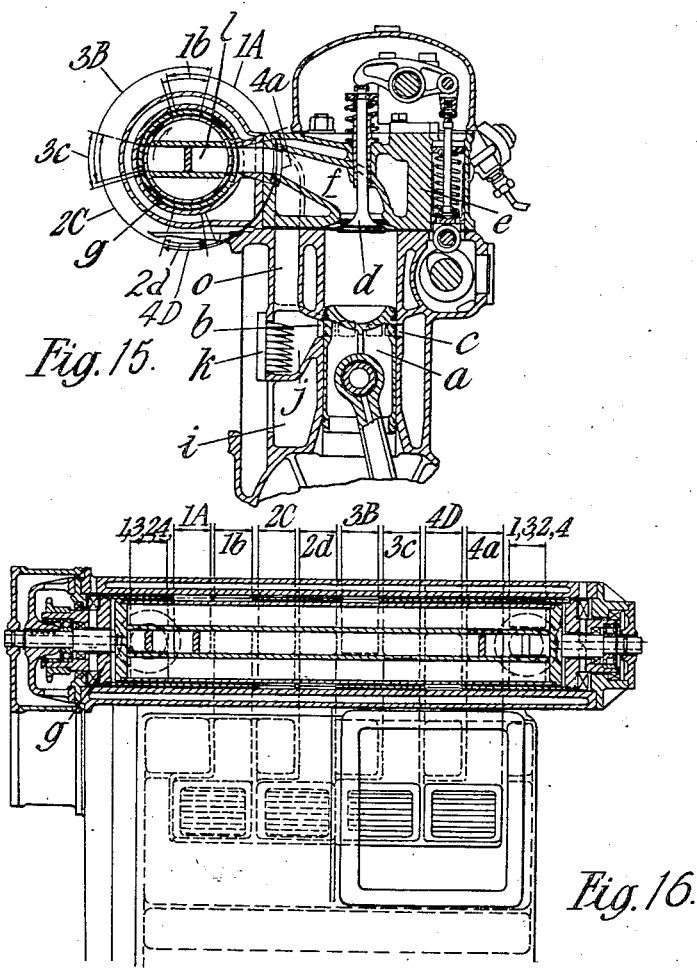

March 18, 1958     J. J. S. SMITH     2,827,027
MULTI-CYLINDER TWO-STROKE CYCLE
INTERNAL COMBUSTION ENGINES Filed June 9, 1955     11 Sheets-Sheet 10

Inventor:
James John Stewart Smith
by
Attorney

United States Patent Office 2,827,027
Patented Mar. 18, 1958

2,827,027

MULTI-CYLINDER TWO-STROKE CYCLE INTERNAL COMBUSTION ENGINES

James John Stewart Smith, London, England, assignor to Sir W. G. Armstrong Whitworth & Company (Engineers) Limited, London, England Application June 9, 1955, Serial No. 514,215

Claims priority, application Great Britain June 10, 1954

10 Claims. (Cl. 123—59)

This invention relates to multi-cylinder two-stroke cycle internal combustion engines, and to improved methods of supercharging such engines by utilising the energy from the exhaust of each cylinder to supercharge preceding cylinders in the firing order, in which the fresh charge is allowed to pass through the cylinder into the exhaust branch and later the exhaust wave from the following cylinder compresses this charge and returns it into the cylinder thereby supercharging the latter.

It is one object of the present invention to provide improved means for carrying out the above method, which enables the engine structure to be simplified, which more precisely control the exhaust outlets from each cylinder and in which less expansion is permitted during the period the exhaust action is traveling along the duct communicating between the exhaust orifices of each following cylinder to that of the selected preceding cylinder.

The invention also relates to methods of improving the efficiency of the charging and/or supercharging process of two-stroke cycle internal combustion engines by utilising the energy from the exhaust of each cylinder to supercharge the preceding cylinder in the firing order by way of the inlet orifice of the latter cylinder towards the end of the charging period of the same and when the exhaust orifices of the cylinder are closed or substantially closed. The object is achieved by arranging for fresh charge to enter a separate supercharging duct and later for the exhaust wave from the following cylinder to compress this fresh charge and pass it into the cylinder thereby supercharging the latter.

It is a further object of the present invention to provide improved means for carrying out the above method which will simplify the structure and control of the connecting passages without sacrificing the supercharging efficiency of the engine.

In the two above embodiments the supercharging action has to take place either through an exhaust orifice after the inlet orifice is closed, or through an inlet orifice after the exhaust orifice is closed. In normal practice this means that only a short period may be allowed for the supercharging action as only a limited area can be made available towards the closing of the orifices, it follows that the time area available for the return of the fresh charge from the exhaust branch or inlet supercharging duct is strictly limited.

It is therefore a still further object of the invention to increase the time area of the orifices available for the return of the fresh charge to the cylinder and to provide a method and means to enable the supercharging action to take place through both the exhaust and inlet orifices. In this way the supercharging action is not confined to the overlap period, while the area is increased by using both sets of ports. The fact that only half the exhaust energy is available in the duct leading to each set of orifices is more than compensated for by the increased area.

Each of the three objects of the invention above referred to may be achieved, in accordance with the invention, in two alternative ways, namely, by providing a rotary valve having a single duct for the supercharging exhaust or a rotary valve having a duct for each cylinder exhausting into the rotary valve and therefore the alternative embodiments of the invention to be hereinafter described fall into one of six groups depending upon which object is being achieved and which type of rotary valve ducting is used. The six groups into which the embodiments fall are as follows:

*First group.*—Supercharging back through exhaust with rotary valve having a plurality of ducts.

*Second group.*—Supercharging back through exhaust with rotary valve having one duct.

*Third group.*—Supercharging through inlet with rotary valve having one duct.

*Fourth group.*—Supercharging through inlet with rotary valve having a plurality of ducts.

*Fifth group.*—Supercharging back through exhaust and through inlet with rotary valve having one duct.

*Sixth group.*—Supercharging back through exhaust and through inlet with rotary valve having a plurality of ducts.

The above will be referred to as such where required to avoid repetition of description.

The accompanying drawings show, by way of example only, a number of embodiments of the invention in which:

Figures 1 to 4 show an example from the first group of embodiments and are as follows:

Figure 1 is a cross sectional elevation through the exhaust valve and rotary valve of a valve-in-head engine, Figure 2 is a sectional side elevation through the rotary valve of Figure 1, Figure 3 is a cross sectional elevation through alternative outlet ports in the rotary valve, Figure 4 is a time area diagram suitable for a four cylinder engine employing the form of rotary valve shown on Figures 1 and 2, Figure 5 is a time area diagram suitable for a four cylinder engine from the second group of embodiments, employing an alternative form of rotary valve, Figures 6 to 9 show an example from the third group of embodiments in respect of an exhaust-valve-in-head four cylinder engine, and are as follows:

Figures 10 to 14 show examples from the fourth group of embodiments, and as the application to valve-in-head engines will be understood from the first and sixth embodiments, the application to loop scavenge and opposed piston engines are shown, as follows:

Figure 13:
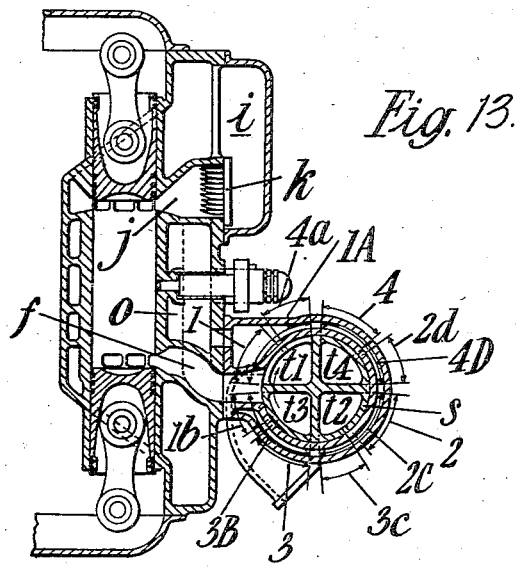
Figure 14:
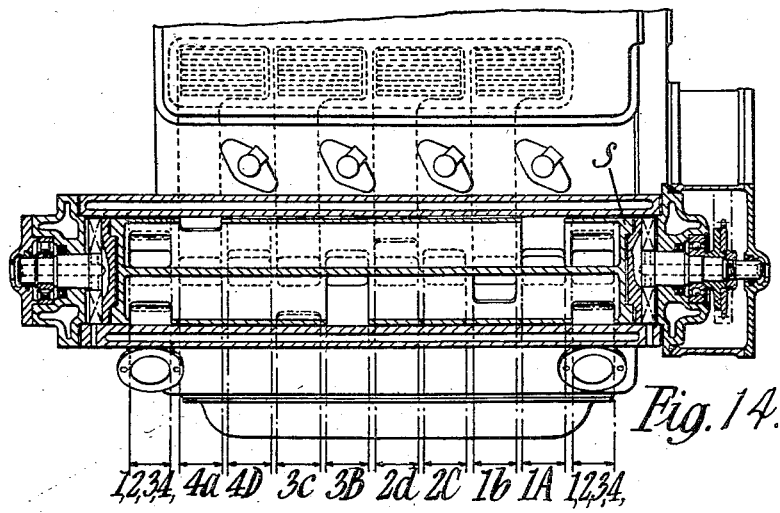

Figure 10 is a cross section elevation of a four cylinder loop scavenging engine, fitted with a four duct rotary valve, Figure 11 is a longitudinal section through the rotary valve of Figure 10, Figure 12 is a sectional plan showing the ducting in the cylinder block of Figure 10, Figure 13 is a cross sectional elevation of a four cylinder opposed piston engine, fitted with a four duct rotary valve, Figure 14 is a longitudinal section through the rotary valve of Figure 13.

Figures 15 to 18 show an example from the fifth group of embodiments and are as follows:

Figure 15 is a cross sectional elevation through the exhaust valve and rotary valve of a valve-in-head engine, Figure 16 is a part sectional side elevation through the rotary valve of Figure 15, Figure 17 is a part sectional plan through the rotary valve of Figure 15.

Figure 18:
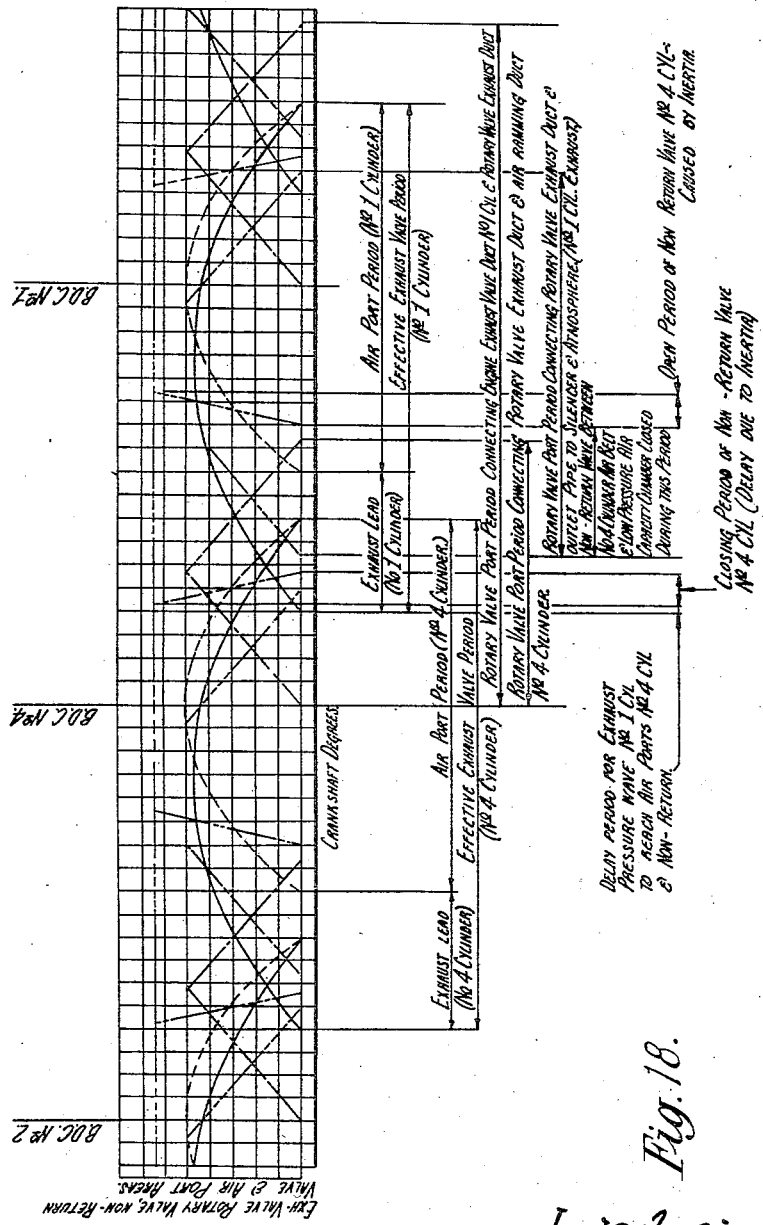

Figure 18 is a time area diagram for a four cylinder engine employing the form of rotary valve shown on Figures 15 to 17.

Figure 19:
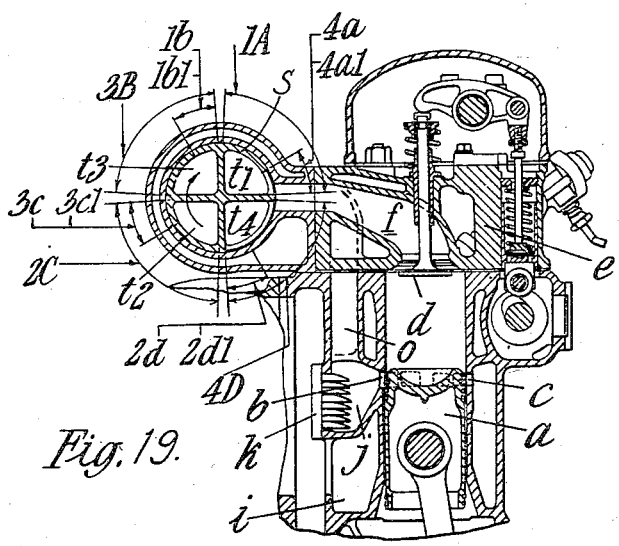
Figure 20:
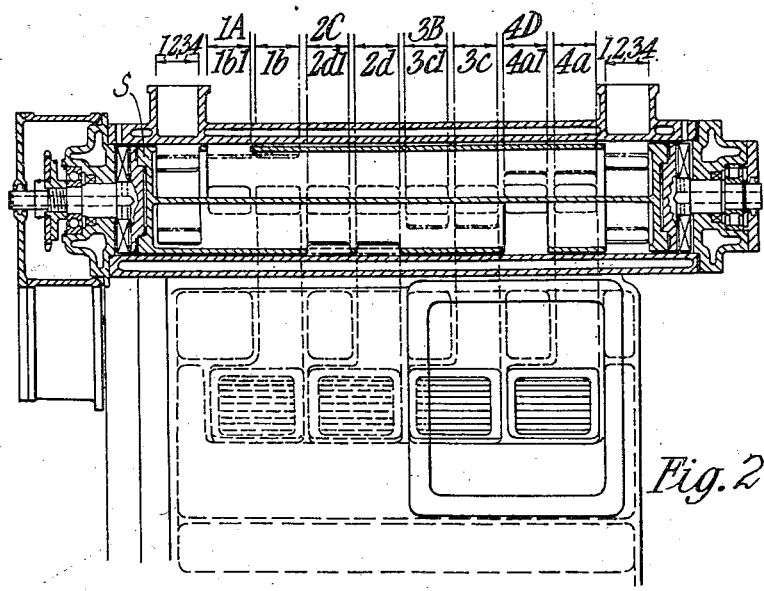
Figure 21:
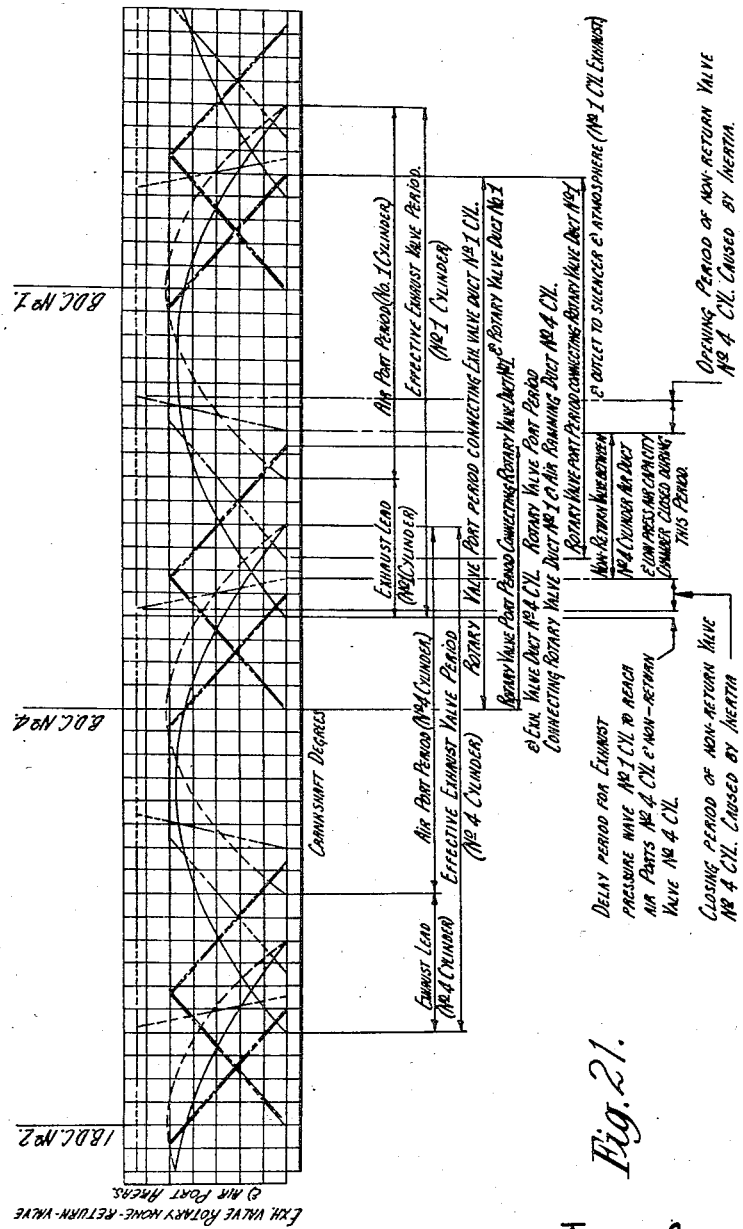

Figures 19 to 21 show an example from the sixth group of embodiments and are as follows:

Figure 19 is a cross sectional elevation through the exhaust valve and an alternative form of rotary valve, of a valve-in-head engine, Figure 20 is a part sectional side elevation through the rotary valve of Figure 19, Figure 21 is a time area diagram for a four cylinder engine employing the form of rotary valve shown on Figures 19 and 20.

A first group embodiment will now be described by way of example.

In Figures 1 to 3 inclusive $d$ is the exhaust valve of a four cylinder valve-in-head two-stroke cycle internal combustion engine in which the firing order is 1, 3, 2, 4. The cylinders receive fresh charge at low pressure, by way of piston controlled inlet ports, from a blower or air compressor—not shown and which may be driven by the engine or by an exhaust gas turbine. The exhaust valves $d$ in cylinder head $e$ are cam operated and control the outflow of exhaust gases from the cylinders to exhaust ducts $f$, and also the return of fresh charge from the latter into the cylinder. The outflowing exhaust gases, and the wave initiated thereby are further controlled by a rotary valve $s$ which rotates at engine speed and which has ports 1A, 3B, 2C and 4D so positioned as to open and close, at predetermined intervals, the outlets from the ducts $f$ of cylinders 1, 3, 2 and 4 respectively, and place the latter in communication with the separate rotating ducts $t1$, $t3$, $t2$ and $t4$ respectively. Ports 1, 3, 2 and 4 are arranged at each end of the rotary valve $s$ at predetermined intervals, and provide communication between the ducts $t1$, $t3$, $t2$ and $t4$ and ducts $u$, and thence by way of an exhaust pipe to the inlet of an exhaust gas turbine or to the exhaust silencer and/or to atmosphere. Ports $4a1$, $1b1$, $3c1$ and $2d1$ are arranged at predetermined intervals to place ducts $t1$, $t3$, $t2$ and $t4$ in communication with exhaust ducts $f$ of cylinders 4, 1, 3 and 2 respectively. When the piston opens the cylinder inlet ports, fresh charge at low pressure flows into the cylinder in the wake of the exhausting gases and the quantity of fresh charge passed into the cylinder is equal to the quantity required to charge the cylinder to the pressure of supply, plus the quantity necessary to supercharge the cylinder to a predetermined higher pressure, plus the quantity that it is desired should remain in the exhaust system at the end of the charging period. The latter two quantities will pass through the cylinder and enter the exhaust duct $f$, the exhaust valve $d$ being open during the whole of the scavenging, charging and supercharging periods.

Around B. D. C. of No. 4 cylinder, port 1A leading to duct $t1$ begins to uncover duct $f1$ of No. 1 cylinder, and port $4a1$ leading to duct $t1$ begins to uncover duct $f4$ of No. 4 cylinder. With the opening of exhaust valve $d$ of No. 1 cylinder the ports 1A and $4a1$ are approaching their fully open positions, and at this time the outlet ports 4 communicating with the exhaust outlet ducts $u$ leading to the exhaust gas turbine or to the silencer and/or to atmosphere are closed or substantially closed. The exhaust wave from No. 1 cylinder passes along the exhaust ducts $f1$ and $t1$ and compresses the air which has passed through No. 4 cylinder into exhaust duct $f4$, and returns it through the exhaust valve orifice into No. 4 cylinder thereby supercharging it. The ramming or wave supercharging action continues until the exhaust orifice of No. 4 cylinder is closed by valve $d$ and at approximately or just before this moment, dependent upon the length of the communicating ducting which controls the time interval for the reflected wave to reach the outlet ducts, the ports 1 begin to allow communication between rotary valve duct $t1$ and the duct $u$ leading to the inlet of an exhaust gas turbine or to an exhaust silencer and/or to atmosphere. These ports remain open until approximately or just after the exhaust valve opening point of the next cylinder to exhaust, and should be fully closed before the exhaust wave from that cylinder reaches them.

The sequence of events described occurs four times per revolution in the four cylinder engine described.

Two exhaust ducts $u$ leading from ports 1, 3, 2, 4 at each end of the rotary valve are shown in the example described, but one duct could be arranged to perform satisfactorily. It will be observed that for a short period towards the end of the process described above duct $t1$ is in communication with duct $t3$ through port 1A, duct $f1$, and port $1b1$ but at this time the exhaust from No. 1 cylinder is completed and scavenging and charging is taking place, and the exhaust from No. 3 cylinder has not yet commenced, while duct $t1$ is still open to exhaust through port 1 and duct $u$, so that a pressure above the ambient cannot exist in duct $t3$.

Alternative timing of the opening and closing of the ports in the rotary valve may be used to give substantially the same effect. For example, instead of the ports 1A and $4a1$ of duct $t1$ opening together and 1A remaining open for a much longer period than $4a1$, the arrangement may be such that port 1A of duct $t4$ opens an equivalent period after $4a1$ of duct $t4$ and closes at the same time. In the latter case, for a short period immediately following the supercharging period, the ports $1b1$ and 1A would both be partially open to ducts $t4$ and $t1$ respectively, but the exhaust duct $u$ leading from duct $t1$ to exhaust would be opened thus enabling the gases in duct $t4$ to pass back into $f1$ and then into $t1$ and escape to duct $u$. Alternatively, the trapping of any residual pressure in duct $t4$ upon the closing of port 1A could be prevented by providing a further outlet duct $w$ as shown in Figure 3 which has its port leading from the rotary valve positioned at approximately 90°, for a four cylinder engine, to that of the port of duct $u$. Ports 1, 3, 2 and 4 would thus be opened to exhaust twice per cycle, and for the sequence of events described above port 1 would permit the escape of the main exhaust from No. 1 cylinder via duct $t1$, whilst port 4 would prevent the trapping of pressure in duct $t4$.

Figure 4:
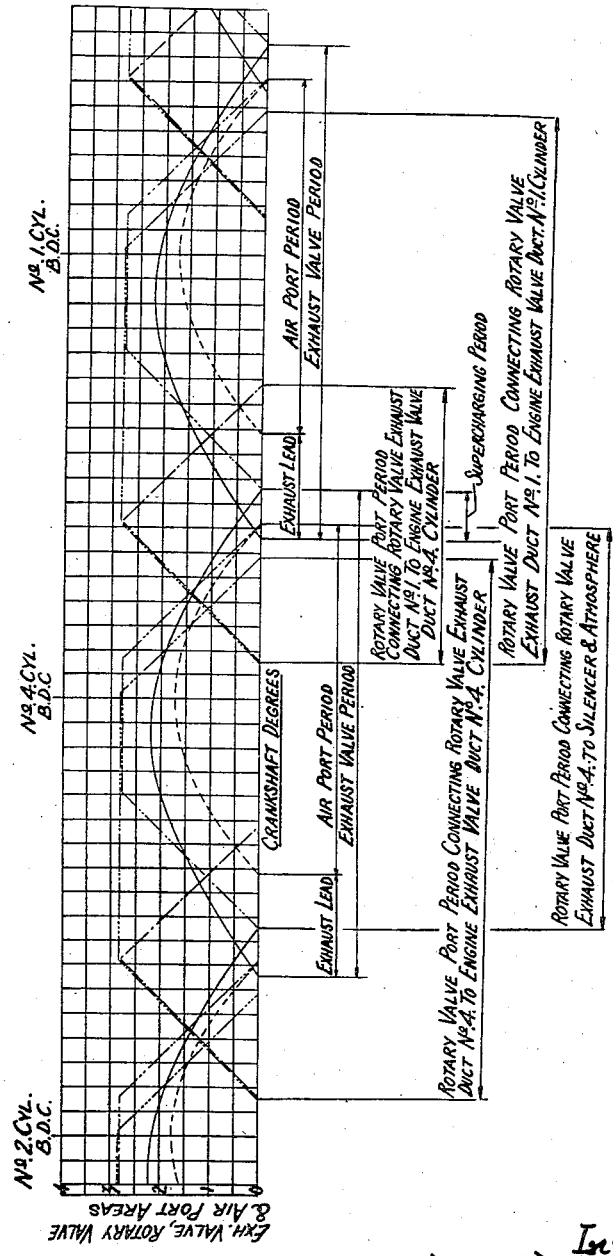

Figure 4 shows a typical time area diagram of the sequence of events described.

Figure 5:
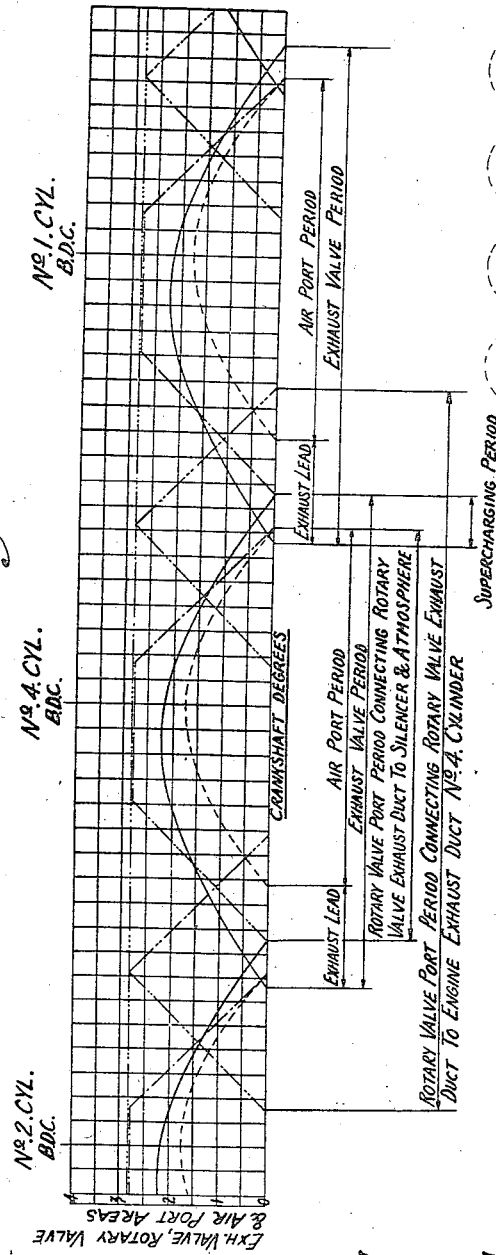

In a second group embodiment, substantially similar results can be obtained by employing a different form of rotary valve. This valve will be described in detail in connection with third and fifth group embodiments, and comprises a stationary inner part containing a single duct that is arranged to communicate with all cylinders by means of a rotating outer sleeve. Apart from the rotary valve, the engine may be almost identical, but as the arrangement of the ports and their timing will be different from those of Fig. 4, a typical time area diagram is reproduced in Fig. 5.

Figure 8:
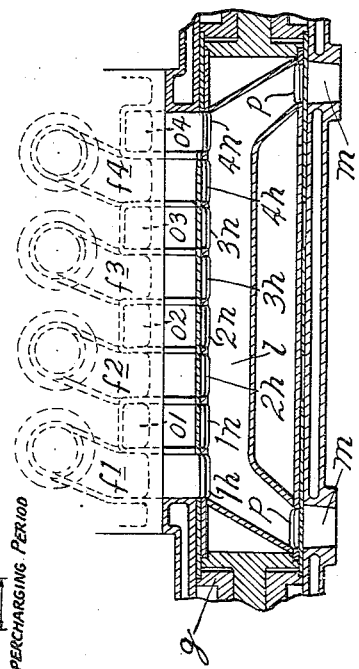
Figure 8 is a part sectional plan view through the rotary valve.
Figure 6:
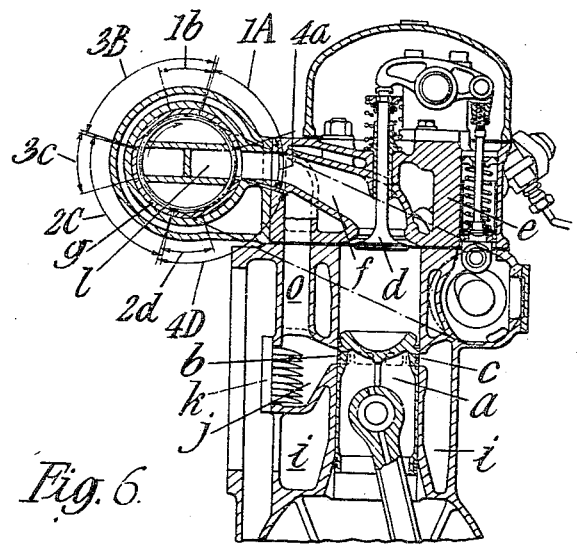
Figure 6 is a cross sectional elevation of the engine.
Figure 7:
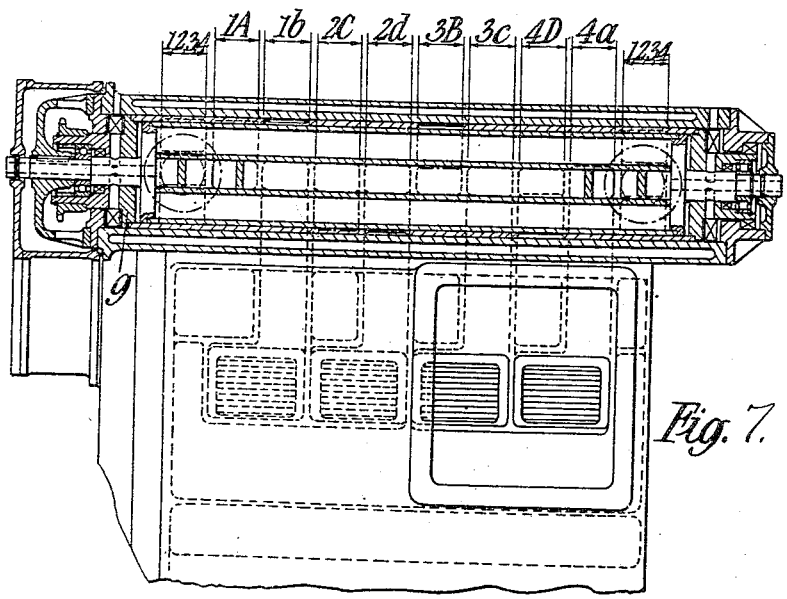
Figure 7 is a longitudinal sectional view through the rotary valve.

A third group embodiment will now be described. Figures 6 to 8 show various views of an exhaust valve-in-head four cylinder engine in which the firing order is 1, 3, 2, 4. In Figure 6 $a$ is the power piston and controls the timing of air inlet ports $b$ and $c$. Ports $b$ receive air from air belt $j$ which communicates with the low pressure air belt $i$ through non-return valves $k$. Air inlet ports $c$ are arranged to open later and close earlier than ports $b$ and are in direct communication with low pressure air belt $i$. A blower or compressor which may be driven by the engine or by an exhaust gas turbine supplies air to the air belt $i$ at low pressure. The exhaust valves $d$ in the cylinder head $e$ are cam operated and control the outflow of exhaust gases to the exhaust duct $f$ in cylinder head $e$. In this example the outflowing exhaust gases and the wave initiated thereby are further controlled by a rotary valve $g$, comprising a stationary inner part and a rotating outer sleeve, which rotates at engine speed and which has ports 1A, 3B, 2C and 4D so positioned as to control at predetermined intervals, the ducts $f$ of cylinders 1, 3, 2 and 4 respectively. The ports 1A, 3B, 2C and 4D allow communication between ducts $f1$, $f3$, $f2$, $f4$ of cylinder head $e$, by way of stationary ports $1h$, $3h$, $2h$, $4h$, to a common stationary inner duct $l$ housed in the inner part of the rotating valve $g$. The stationary duct $l$ communicates by way of ports 1, 3, 2 and 4, arranged in the rotary valve $g$ at predetermined intervals, with duct $m$, through port $p$ and thence via an exhaust pipe, to the inlet of an exhaust gas turbine, or to the exhaust silencer and/or to atmosphere. Ports $4a$, $1b$, $3c$ and $2d$ in the rotary valve $g$ are arranged at predetermined intervals to place the stationary duct $l$, by way of stationary ports $4n$, $1n$, $3n$, $2n$, in communication with the supercharging ducts $o4$, $o1$, $o3$, $o2$.

Air is delivered by the blower or compressor to capacitor chamber $i$ and by way of non-return valves $k$ to the supercharging duct $o$, and to air belt $j$ around part of each cylinder. In this embodiment, air from belt $j$ is delivered to only a fraction of the total number of air ports around the cylinder, i. e. those indicated by $b$; while the remainder of the ports i. e. those indicated by $c$, are in direct communication with air capacity chamber $i$. With the opening of ports $b$, air at low pressure flows to the cylinder in the wake of the exhausting gases and this flow is augmented a little later by the opening of ports $c$. At around B. D. C. of No. 4 cylinder, port 1A of the rotary valve begins to uncover duct $f1$ and at the same time it also uncovers the stationary port $1h$ leading to stationary duct $l$, whilst port $4a$ of the rotary valve begins to uncover stationary port $4n$ thus placing supercharging duct $o4$ in communication with stationary duct $l$. With the opening of exhaust valve $d$ of No. 1 cylinder the port 1A leading from exhaust duct $f1$ to the stationary duct $l$ is approximately fully open, whilst the port $4a$ leading from stationary duct $l$ to supercharging duct $o4$ is also approximately fully open. At this time there is no communication with the exhaust outlet to a silencer and/or atmosphere. Just after the effective exhaust valve opening point of No. 1 cylinder, low pressure air ports $c$ of No. 4 cylinder are closed by the piston and the exhaust wave from No. 1 cylinder travels by way of the exhaust ducts $f1$ and $l$ and compresses the air in duct $o4$ and in air belt $j$ of No. 4 cylinder, so that additional air passes into No. 4 cylinder through ports $b$ of that cylinder. When the pressure rises in air belt $j$ the non-return valves $k$ close, thus preventing the loss of exhaust energy to the air in the air capacity chamber $i$. At approximately or just after this time, dependent upon the lengths of the ducting, which controls the time interval for the exhaust wave to effectively act on the air in the air belt $j$ of No. 4 cylinder, the exhaust valve of No. 4 cylinder closes thus preventing a loss of air to duct 4. The supercharging continues until the air ports $b$ of cylinder 4 are closed, but at approximately or just before this, and again dependent on the length of the communicating ducting, the port 1 begins to uncover stationary port $l$ leading from stationary duct $l$ to duct $m$ and thence to the inlet of an exhaust gas turbine or to the outlet pipe to the silencer and/or to atmosphere. This port remains open during substantially the remainder of the No. 1 cylinder exhaust valve period. The non-return air valves $k$ re-open as soon as the pressure in the air belt $j$ falls below that in air belt $i$.

Figure 9:
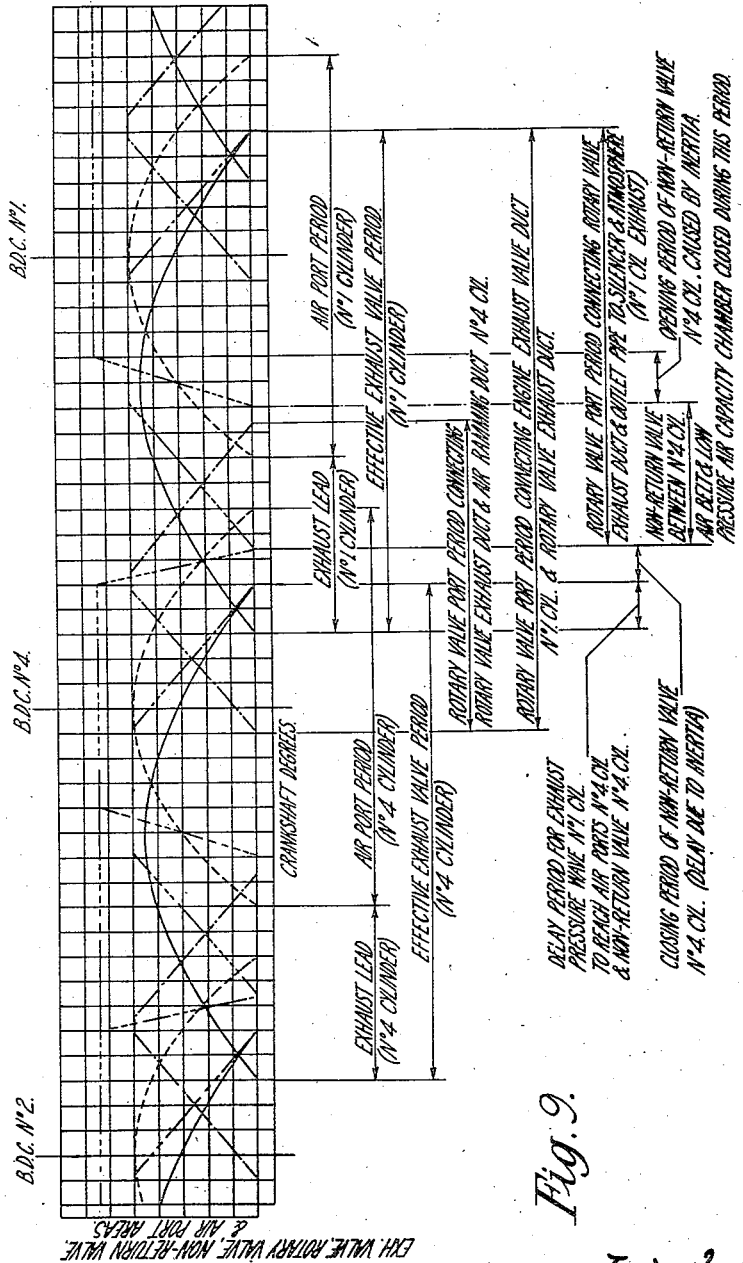
Figure 9 is a time area diagram suitable for this embodiment.

Various arrangments of air ports may be used. For example the air ports may all be the size of $b$ and all communicate with the air belt $j$, so that all the low pressure air passes through the non-return valves $k$. In another arrangement, non-return valves $k$ are provided on both sides of the cylinder, thus providing large area through the non-return valves. In all cases, air passing through a non-return valve $k$ must be able to reach one cylinder only, for example, by providing walls across the air chest between each cylinder, and at the end of the outer cylinders. This ensures that the supercharging action raises the pressure to a high value, because the volume of the space is made the minimum permissible, while providing the necessary passage area. Fig. 9 shows a typical time area diagram for the arrangement in which the air ports are all the same height.

A further arrangement has two sets of ports, the larger set being further away from the cylinder head and communicating with the low pressure air chamber $i$. The smaller set, or supercharging ports are nearer the cylinder head and communicate with the high pressure air chamber $j$ and supercharging duct $o$. The smaller set may partly or completely surround the cylinder. Non-return valves are not required with this arrangement.

In a fourth group embodiment, substantially similar results can be obtained by employing the type of rotary valve which has a plurality of ducts, and which is described in relation to the first and sixth group embodiments. In comparison with the first group embodiment, additional ports will be necessary to provide communication between ducts $t$ and supercharging ducts $o$, while the ports providing communication between ducts $t$ and $f$ during the charging period of each cylinder, will not be required. These requirements are included in the sixth group embodiment, and the differences are matters which will be understood by those skilled in engine design.

Figures 10, 11 and 12 show how the invention can be applied to a loop or cross scavenging engine.

With the exception that the piston controls the exhaust porting, the sequence of events takes place as already described.

In this embodiment the air inlet ports open before the exhaust ports, and therefore the exhaust gases will move into the air belts $j$ leading to the air belt $i$ and to the supercharging duct $o$ during the short interval before the exhaust ports open. However, no harm will be done as both these ducts are closed at their outer ends; the duct to the air belt by non-return valve $k$ and the supercharging duct by the rotary valve. The low pressure air in these ducts will be compressed by the exhaust gases from the cylinder, but as there is no outlet the air and gases will re-expand as the pressure in the cylinder falls following the opening of the exhaust ports, and very little mixing will occur, while the passages will be scavenged by the flow of low pressure air into the cylinder.

Figures 13 and 14 show how the invention can be applied to an opposed piston engine.

Again with the exception that the exhaust piston controls the exhaust porting the sequence of events takes place as already described.

A fifth group embodiment will now be described. In Figures 15 to 17 inclusive a four cylinder engine is illustrated in which the firing order is 1, 3, 2, 4.

In Figure 15, $a$ is the power piston of a valve-in-head engine and controls the timing of air inlet ports $b$ and $c$. Ports $b$ receive air from air belt $j$ which communicates with the low pressure air belt $i$ through non-return valves $k$. Air inlet ports $c$ are arranged to open later and close earlier than ports $b$ and are in direct communication with low pressure air belt $i$. A blower or compressor, which may be driven by the engine, or by an exhaust gas turbine, supplies air to the air belt $i$ at low pressure. The exhaust valves $d$ in the cylinder head $e$ are cam operated and control the outflow of exhaust gases from the cylinder to the exhaust duct $f$ and also the return of fresh charge from the latter into the cylinder. In this example, the outflowing exhaust gases and the wave initiated thereby are further controlled by a rotary valve $g$, comprising a stationary inner part and a rotating outer sleeve, which rotates at engine speed, the sleeve having ports 1A, 3B, 2C and 4D so positioned as to open and close, at predetermined intervals, the outer ends of the ducts $f1$, $f3$, $f2$, $f4$ of cylinders 1, 3, 2 and 4 respectively. The ports 1A, 3B, 2C and 4D allow communication between ducts $f1$, $f3$, $f2$, $f4$ of cylinder head $e$ by way of stationary ports $1h$, $3h$, $2h$, $4h$ to a common stationary inner duct $l$ housed in the inner part of the rotary valve $g$. Ports 1, 3, 2 and 4 arranged at each end of the rotary valve $g$ and at predetermined intervals, provide communication between duct $l$ and ducts $m$ through port $p$, and thence via an exhaust pipe with the inlet of a gas turbine or to the exhaust silencer and/or to atmosphere. Ports $4a$, $1b$, $3c$ and $2d$ in the rotary valve $g$ are arranged at predetermined intervals to place the stationary duct $l$, by way of stationary ports $4n$, $1n$, $3n$, $2n$, in communication with the supercharging ducts $o4$, $o1$, $o3$, $o2$. Air is delivered by a blower or compressor to low pressure air belt $i$ and by way of non-return valves $k$ to the supercharging duct $o$ and to air belt $j$ around part of each cylinder. In this embodiment, air from belt $j$ is delivered to only a fraction of the number of air ports round the cylinder, i. e. those indicated by $b$, while the remainder of the ports, i. e. those indicated by $c$ are in direct communication with air capacity chamber $i$. With the opening of ports $b$ air at low pressure flows to the cylinder in the wake of the exhausting gases and this flow is augmented a little later, when the ports $c$ are opened. Air in excess of that required to fill the cylinder at the pressure of supply passes through the cylinder and enters the exhaust duct $f$ leading from the orifice of exhaust valve $d$, which is open during the whole of the scavenging, charging and supercharging periods. At around B. D. C. of No. 4 cylinder, port 1A begins to uncover both the exhaust duct $f1$ and the stationary port $1h$ leading to stationary duct $l$ whilst port $4a$ begins to uncover port $4n$ thus placing supercharging duct $o4$ in communication with stationary duct $l$. With the opening of exhaust valve $d$ of No. 1 cylinder the port 1A leading from exhaust duct $f1$ to stationary duct $l$, and the port $4a$ leading from stationary duct $l$ to supercharging duct $o4$ are approximately fully open whilst the port 4D between exhaust duct $f4$ and stationary duct $l$ is fully open. At this time the ports communicating with the exhaust outlet to the exhaust gas turbine or to the silencer and/or atmosphere are closed or substantially closed. Just after the exhaust valve opening point of No. 1 cylinder low pressure air ports $c$ of No. 4 cylinder are closed by the piston. The exhaust wave from No. 1 cylinder travels by way of the exhaust ducts $f1$ and $l$ and compresses the air which has passed into supercharging duct $o4$ and air belt $j$ of No. 4 cylinder and also compresses the air which has passed through No. 4 cylinder into exhaust duct $f4$, and returns a portion of said air through the open inlet and exhaust orifice, respectively, into No. 4 cylinder, thereby supercharging that cylinder. When the pressure rises in the air belt $j$ the non-return valves $k$ close thus preventing the loss of exhaust energy to the air in the capacity chamber $i$. They remain closed during the supercharging process and reopen when the pressure in air belt $j$ falls below that of air belt $i$. The supercharging continues until the air ports $b$ and exhaust valve $d$ of No. 4 cylinder are closed, but at approximately or just before this, and dependent upon the length of the communicating ducting which controls the time interval for the exhaust wave to effectively perform the above mentioned actions, the port 1 begins to uncover stationary port $p$ leading from stationary duct $l$ to duct $m$ and thence to the inlet of an exhaust gas turbine or to the exhaust outlet pipe and silencer and/or to atmosphere. This port $p$ remains open during substantially the remainder of the No. 1 cylinder exhaust valve open period.

Figure 18 shows a typical time area diagram which is applicable to the sequence of events described and in particular to the air porting arrangements mentioned earlier where there is no sudden change in the air port areas such as is caused by the two different heights of ports $b$ and $c$ shown in Figure 15.

A sixth group embodiment will now be described.

Figures 19 and 20 show views of an exhaust valve-in-head four cylinder engine, in which the firing order is 1, 3, 2, 4. The type of rotary valve employed has a plurality of ducts and is similar to that already described for the first group of embodiments.

In this example the exhaust valves $d$ in cylinder head $e$ are again cam operated and control the discharge and return of gases, and their wave actions from or to the cylinder. The outflowing exhaust gases and the wave initiated thereby are further controlled by a rotary valve $s$ which rotates at engine speed and which has ports 1A, 3B, 2C and 4D so positioned as to open and close, at predetermined intervals, the outlet from the ducts $f$ of cylinders 1, 3, 2 and 4 respectively, to place the latter in communication with the separate rotating ducts $t1$, $t3$, $t2$ and $t4$ respectively. Ports 1, 3, 2 and 4 are arranged at each end of the rotary valve $s$, at predetermined intervals, and provide communication between the ducts $t1$, $t3$, $t2$ and $t4$ and ducts $u$ and thence by way of an exhaust pipe to the inlet of an exhaust gas turbine or to the exhaust silencer and/or to atmosphere. Ports $4a$, $1b$, $3c$ and $2d$ in the rotary valve $s$ are arranged at predetermined intervals to place the ducts $t1$, $t3$, $t2$ and $t4$ in communication with supercharging ducts $c$ of cylinders 4, 1, 3 and 2 respectively. Ports $4a1$, $1b1$, $3c1$ and $2d1$ are further arranged at predetermined intervals to place ducts $t1$, $t3$, $t2$ and $t4$ in communication with exhaust ducts $f$ of cylinders 4, 1, 3 and 2 respectively.

With this rotary valve the sequence of events is almost the same as that described for the fifth group embodiment, although the ducting within the rotary valve is no longer stationary and common to all cylinders since in this case the ducts rotate and a separate duct controls the movement of the exhaust from each cylinder and the wave action initiated thereby. The supply of fresh charge to the cylinder and to the supercharging and exhaust ducts takes place as previously described. Around B. D. C. of No. 4 cylinder, port 1A leading to duct $t1$ begins to uncover duct $f$ of No. 1 cylinder, whilst port $4a$ leading from duct $t1$ begins to uncover supercharging duct $o4$ which communicates with No. 4 cylinder, and port $4a1$ leading from duct $t1$ begins to uncover exhaust duct $f$ of No. 4 cylinder. With the opening of exhaust valve $d$ of No. 1 cylinder the ports 1A, $4a$ and $4a1$ are approaching the fully open position and at this time the outlet ports 1 and 4 communicating with the exhaust outlet ducts $u$ leading to the exhaust gas turbine or to the silencer and/or atmosphere are closed or substantially closed. Just after the exhaust valve opening point of No. 1 cylinder, low pressure air ports $c$ of No. 4 cylinder are closed by the piston, and the exhaust wave from No. 1 cylinder passes along the exhaust ducts $f1$ and $t1$ and compresses the air which has passed into supercharging duct $o4$ and air belt $j4$ and also compresses air which has passed through No. 4 cylinder into exhaust duct $f4$, and returns a portion of the said air through the open inlet and exhaust orifices respectively into No. 4 cylinder, thereby supercharging it. The functions of the non-return valve $k$ are as previously described. The ramming or wave supercharging action continues until air ports $b$ and exhaust valve $d$ of No. 4 cylinder close, and at approximately or just before this moment dependent upon the lengths of the communicating ducting which control the time interval for the reflected wave to reach the outlet ducts $u$, the ports 1 begin to allow communication between rotary valve duct $t1$ and ducts $u$ leading to an exhaust outlet pipe and thence to an exhaust gas turbine, or to a silencer and/or to atmosphere. These ports remain open until or just after the exhaust valve opening point of the next cylinder to exhaust, thus allowing for the exhausting, scavenging and charging of that cylinder against a low back pressure. Two outlet ducts $u$ leading from ports 1, 2, 3 and 4 at each end of the rotary valve may be employed, but one duct could be arranged to perform satisfactorily. It will be observed that for a short period towards the end of the process described above duct $t1$ is in communication with duct $t3$ through port 1A, duct $f1$, and port $1b1$ but at this time the exhaust from No. 1 cylinder is completed and scavenging and charging is taking place, and the exhaust from No. 3 cylinder has not yet commenced, while duct $t1$ is still open to exhaust through port 1 and duct $u$, so that a pressure above the ambient cannot exist in duct $t3$.

Figure 21 shows a typical time area diagram which is applicable to the sequence of events described and in particular to the air porting arrangements mentioned earlier where there is no sudden change in the air port areas such as is caused by the two different heights of ports $b$ and $c$ as shown in Figure 19.

Throughout the specification the invention has been described in relation to four cylinder engines, having their cranks phased at 90° to each other, and the sequence of events described occurs four times per revolution of the engine crankshaft, so that the energy in the exhaust from each cylinder supercharges the preceding cylinder in the firing order.

It will be understood by those skilled in the art that by suitable adjustment of the timing of the various events, in accordance with established practice with the instructions given above, the invention may be applied to three cylinder engines, having their cranks phased at 120° to each other.

Engines having multiples of four or three cylinders may be employed, the rotary valve for each bank of four or three cylinders being isolated from the others.

In the embodiments described, the rotary valve has been arranged to rotate at engine speed, but it could be arranged to rotate at a multiple or sub-multiple of engine speed.

The application of the invention to loop or cross scavenged engines and to opposed piston engine has been described and illustrated in relation to exhaust wave supercharging through a duct communicating with the inlet orifices. These arrangements, in conjunction with those for supercharging back through the exhaust orifices, and through both the exhaust and inlet orifices simultaneously, will enable anyone skilled in engine design to apply any of the embodiments of the invention, to these or any other types of engines.

Any of the inlet port arrangements described may be employed with any of the embodiments.

It is to be understood that the above embodiments of the invention are given by way of example only and that details for carrying the invention into effect may be varied without departing from the scope of the invention claimed.

I claim:

1. A multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, passage means associated with at least one of said orifices, an exhaust outlet duct means for conducting exhaust gases away from said exhaust orifices and along which the gases travel with the minimum of expansion and which includes a ported rotary valve driven by and in synchronism with the engine which closes the duct means to the exit of exhaust gases during each supercharging period, and a source of fresh charge under pressure, the timing of the control of the inlet and exhaust orifices being such that fresh charge in excess of that required to fill each cylinder at the pressure of supply from the said source passes into the cylinder and into the passage means during the charging period of each cylinder, the rotary valve connecting the exhaust orifice of each cylinder in the sequence of the firing order in turn during the early part of its exhaust period with the passage means of the cylinder being at that time charged, during the later part of its charging period, so that the charge in said passage means is compressed and a portion of it is delivered into the cylinder being charged.

2. A multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, exhaust passage means leading to each exhaust orifice, an exhaust outlet duct means for conducting exhaust gases away from said exhaust orifices and along which the gases travel with the minimum of expansion and which includes a ported rotary valve driven by and in synchronism with the engine which closes the duct means to the exit of exhaust gases during each supercharging period, and a source of fresh charge under pressure, the timing of the control of the inlet and exhaust orifices being such that fresh charge in excess of that required to fill each cylinder at the pressure of supply from the said source passes into the cylinder and into the exhaust passage means during the charging period of each cylinder, the rotary valve connecting the exhaust orifice of each cylinder in the sequence of the firing order in turn during the early part of its exhaust period with the exhaust passage means of the cylinder being at that time charged during the later part of its charging period, so that the charge in said exhaust passage means is compressed and a portion of it is delivered into the cylinder being charged.

3. Multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, inlet passage means leading to each inlet orifice, an exhaust outlet duct means for conducting exhaust gases away from said exhaust orifices along which the gases travel with the minimum of expansion and including a ported rotary valve driven by and in synchronism with the engine which closes the duct means to the exit of exhaust gases during each supercharging period, and a source of fresh charge under pressure, the timing of the control of the inlet and exhaust orifices being such that fresh charge in excess of that required to fill each cylinder at the pressure of supply from the said source passes into the cylinder and into the inlet passage means during the charging period of each cylinder, the rotary valve connecting the exhaust orifice of each cylinder in the sequence of the firing order in turn during the early part of its exhaust period with the inlet passage means of the cylinder being at that time charged during the later part of its charging period, so that the charge in said inlet passage means is compressed and a portion of it is delivered into the latter cylinder.

4. Multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, inlet passage means leading to each inlet orifice, exhaust passage means leading from each exhaust orifice, an exhaust outlet duct means for conducting exhaust gases away from said exhaust orifices along which the gases travel with the minimum of expansion, and including a ported rotary valve driven by and in synchronism with the engine which closes the duct means to the exit of exhaust gases during each supercharging period, and a source of fresh charge under pressure, the timing of the control of the inlet and exhaust orifices being such that fresh charge in excess of that required to fill each cylinder at the pressure of supply from the said source passes into the cylinder and into the inlet passage means and the exhaust passage means during the charging period of each cylinder, the rotary valve connecting the exhaust orifice of each cylinder in the sequence of the firing order in turn during the early part of its exhaust period with the inlet passage means and the exhaust passage means of the cylinder being at that time charged during the later part of its charging period, so that the charge in said inlet passage means and in said exhaust passage means is compressed and a portion of it is delivered into the latter cylinder from both said passages simultaneously.

5. Multi-cyclinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, supercharging passage means associated with at least one of said orifices, an exhaust outlet duct means for conducting exhaust gases away from said exhaust orifices along which the gases travel with the minimum of expansion, and including a ported rotary valve driven by and in synchronism with the engine, said rotary valve closing the duct means to the exit of exhaust gases during each supercharging period and comprising a ported cylindrical sleeve rotatable between a stationary coaxial inner member having a common duct with which all the ports communicate and a ported stationary coaxial outer member, there being three sets of ports in the rotatable sleeve, a first set each communicating by way of an exhaust passage means with the exhaust orifices of a cylinder, a second set each communicating by way of said supercharging passage means with at least one of the orifices of a cylinder and a third set communicating with the exhaust outlet duct means, and a source of fresh charge under pressure, the timing of the control of the inlet and exhaust orifices being such that fresh charge in excess of that required to fill each cylinder at the pressure of supply from the said source passes into the cylinder and into the supercharging passage means during the charging period of each cylinder, the rotary valve connecting the exhaust orifice of each cylinder in the sequence of the firing order in turn during the early part of its exhaust period with the supercharging passage means of the cylinder being at that time charged during the later part of its charging period, so that the charge in said supercharging passage means is compressed and a portion of it is delivered into the latter cylinder.

6. Multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, supercharging passage means associated with at least one of said orifices, an exhaust outlet duct means for conducting exhaust gases away from said exhaust orifices along which the gases travel with the minimum of expansion, and including a ported rotary valve driven by and in synchronism with the engine, said rotary valve closing the duct means to the exit of exhaust gases during each supercharging period and comprising a ported cylindrical inner member containing a plurality of ducts rotatable within a ported stationary coaxial outer member, there being three sets of ports in the rotatable member, a first set each communicating by way of an exhaust passage means with the exhaust orifices of a cylinder, a second set each communicating by way of said supercharging passage means with at least one of the orifices of a cylinder and a third set communicating with the exhaust outlet duct means, an appropriate port in each set of ports communicating with at least one of the plurality of ducts in the inner member, and a source of fresh charge under pressure, the timing of the control of the inlet and exhaust orifices being such that fresh charge in excess of that required to fill each cylinder at the pressure of supply from the said source passes into the cylinder and into the supercharging passage means during the charging period of each cylinder, the rotary valve connecting the exhaust orifice of each cylinder in the sequence of the firing order in turn during the early part of its exhaust period with the supercharging passage means of the cylinder being at that time charged during the later part of its charging period, so that the charge in said supercharging passage means is compressed and a portion of it is delivered into the latter cylinder.

7. Multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, inlet passage means leading to each inlet orifice, exhaust passage means leading from each exhaust orifice, an exhaust outlet duct means for conducting exhaust gases away from said exhaust orifices and including a ported rotary valve driven by and in synchronism with the engine, said rotary valve comprising a ported cylindrical inner member containing a plurality of ducts and rotatable within a ported stationary outer member, there being four sets of ports in the rotatable member, the first set each communicating by way of an exhaust passage means with the exhaust orifices of a cylinder which is exhausting, a second set each communicating by way of an inlet passage means with the inlet orifices of a cylinder being charged, a third set each communicating by way of an exhaust passage means with the exhaust orifices of a cylinder being charged, and a fourth set communicating with the exhaust outlet duct means, an appropriate port in each set of ports communicating with at least one of the plurality of ducts in the inner member, and a source of fresh charge under pressure, the timing of the control of the inlet and exhaust orifices being such that fresh charge in excess of that required to fill each cylinder at the pressure of supply from the said source passes into the cylinder and into the inlet passage means and the exhaust passage means during the charging period of each cylinder, the rotary valve connecting the exhaust orifice of each cylinder in the sequence of the firing order in turn during the early part of its exhaust period with the inlet passage means and the exhaust passage means of the cylinder being at that time charged during the later part of its charging period, so that the charge in said inlet passage means and in said exhaust passage means is compressed and a portion of it is delivered into the latter cylinder from both said passages simultaneously.

8. Multi-cylinder two-stroke cycle internal combustion engine of the kind in which each of the cylinders is supercharged in respect of pressure and amount by the energy of the exhaust gases of another cylinder, comprising a plurality of cylinders, controlled inlet and exhaust orifices in each cylinder, the inlet orifices communicating with an air belt and through non-return valve means with a low pressure air belt, the air being supplied to the latter by a blower or compressor, passage means associated with at least one of the said orifices, an exhaust outlet duct means for conducting exhaust gases away from said exhaust orifices along which the gases travel with the minimum expansion and including a ported rotary valve driven by and in synchronism with the engine, which closes the duct means to the exit of exhaust gases during each supercharging period, the timing of the control of the inlet and exhaust orifices being such that fresh charge in excess of that required to fill each cylinder at the pressure of supply from the said source passes into the cylinder and into the passage means during the charging period of each cylinder, the rotary valve connecting the exhaust orifice of each cylinder in the sequence of the firing order in turn during the early part of its exhaust period with the passage means of the cylinder being at that time charged during the later part of its charging period, so that the charge in said passage means is compressed and a portion of it is delivered into the latter cylinder.

9. Engine as claimed in claim 1 in which each cylinder has two piston controlled inlet orifices or sets of orifices the first of which is arranged to open earlier and close later than the second, the fresh charge being supplied by a blower or compressor to a low pressure air belt and thence direct to the latter orifice or set of orifices and through non-return valve means and the air belt to the former orifice or set of orifices.

10. Engine as claimed in claim 1 in which the gases leaving the rotary valve by way of the exhaust outlet duct means are passed to the inlet of an exhaust gas turbine.

References Cited in the file of this patent

UNITED STATES PATENTS

| | | |
|---|---|---|
| 2,431,266 | Mansfield et al. | Nov. 18, 1947 |
| 2,476,816 | Carter | July 19, 1949 |